(12) United States Patent
Shukla et al.

(10) Patent No.: US 12,065,100 B2
(45) Date of Patent: Aug. 20, 2024

(54) MOTOR/CONTROLLER AUTHENTICATION SYSTEM

(71) Applicant: STMicroelectronics International N.V., Geneva (CH)

(72) Inventors: Subodh Vikram Shukla, Greater Noida (IN); Saurabh Sona, Greater Noida (IN)

(73) Assignee: STMicroelectronics International N.V., Geneva (CH)

( * ) Notice: Subject to any disclaimer, the term of this patent is extended or adjusted under 35 U.S.C. 154(b) by 234 days.

(21) Appl. No.: 17/383,547

(22) Filed: Jul. 23, 2021

(65) Prior Publication Data

US 2023/0022608 A1 Jan. 26, 2023

(51) Int. Cl.
| | |
|---|---|
| B60R 25/04 | (2013.01) |
| G06F 21/44 | (2013.01) |
| G06F 21/60 | (2013.01) |
| H02P 27/06 | (2006.01) |
| H03K 17/94 | (2006.01) |
| H04B 10/80 | (2013.01) |

(52) U.S. Cl.
CPC ............ B60R 25/04 (2013.01); G06F 21/44 (2013.01); G06F 21/602 (2013.01); H02P 27/06 (2013.01); H04B 10/802 (2013.01); H03K 17/943 (2013.01)

(58) Field of Classification Search
CPC ....... B60R 25/04; H02P 27/06; H04B 10/802; H02K 17/943
USPC .......................................................... 318/558
See application file for complete search history.

(56) References Cited

U.S. PATENT DOCUMENTS

| | | | | |
|---|---|---|---|---|
| 2008/0129238 | A1* | 6/2008 | Andersen ............... | H02H 3/162 318/599 |
| 2010/0045487 | A1* | 2/2010 | Bamba .................. | B63H 21/213 340/5.31 |
| 2013/0116892 | A1* | 5/2013 | Wu .......................... | B60R 25/09 701/45 |
| 2016/0163127 | A1* | 6/2016 | Kim ....................... | B60R 16/033 701/36 |

\* cited by examiner

Primary Examiner — Kawing Chan
(74) Attorney, Agent, or Firm — Crowe & Dunlevy LLC

(57) ABSTRACT

Described herein is an electric motor drive system, including at least one power phase line, an external controller configured to generate a drive signal and provide the drive signal to the at least one power phase line, and motor electronics. The motor electronics include at least one switch coupled between the at least one power phase line and at least one electric motor terminal, and an internal controller configured to cooperate with the external controller to perform an authentication process therebetween. The external controller is further configured to cause the at least one switch to electrically couple the at least one power phase line to the at least one electric motor terminal in response to success of the authentication process.

26 Claims, 4 Drawing Sheets

MOTOR/CONTROLLER AUTHENTICATION SYSTEM

TECHNICAL FIELD

This disclosure is related to the field of the authentication of electric motors, and may find use in vehicular applications, but may also be used in other applications.

BACKGROUND

Vehicles and other products increasingly rely upon electric motors as a source of torque during operation. For example, electric motors may provide rotational torque to the wheels of a vehicle, and/or may provide rotational torque to other components of a vehicle, such as a door locking mechanism, door opening mechanism, steering assist mechanism, window opening mechanism, sun roof opening mechanism, etc. Typically, such an electric motor is paired with an external controller that provides control signals to the electric motor, such as, for example, a request for torque communicated from a gas pedal of a vehicle to an electric motor.

When such an electric motor or its external controller fails, it is desirable for the manufacturer of the vehicle to have a way to ensure that the failed component is replaced with a suitable replacement component (instead of an unsuitable or counterfeit component) so as to ensure proper and safe operation of the vehicle. It is also desirable to prevent the theft of vehicles employing electric motors as sources of torque—for example, to prevent a thief from attaching a controller under their control to an electric motor that provides rotational torque to the wheels of the vehicle and thereby acquiring control of those motors and the ability to drive the vehicle, or, as another example, to prevent a thief from attaching a controller under their control to an electric motor providing rotational torque to a motor of a door locking mechanism of the vehicle and thereby acquiring control of that motor and the ability to unlock the door.

A secure authentication system between electric motors and their external controllers is therefore needed so as to help ensure that the appropriate electric motor is being used with the appropriate external controller.

SUMMARY

Disclosed herein is an electric motor drive system, including at least one power phase line and an external controller. The external controller may include: a source of DC electric power; a microcontroller; and an inverter configured to convert the DC electric power to a drive signal and provide the drive signal to the at least one power phase line, under control of the microcontroller. The external controller includes an electric motor unit. The electric motor unit includes: an electric motor; a microcontroller configured for communication with the microcontroller of the external controller; and at least one switch coupled between the at least one power phase line and the electric motor, the at least one switch being under control of the microcontroller. The microcontroller of the external controller and the microcontroller of the electric motor unit are configured to perform an authentication process therebetween. The microcontroller of the external controller is configured to instruct the microcontroller of the electric motor unit to cause the at least one switch to electrically couple the at least one power phase line to the electric motor in response to success of the authentication process.

The at least one switch may be a transistor having a first conduction terminal coupled to the at least one power phase line, a second conduction terminal coupled to the electric motor, and a control terminal coupled to be controlled by the microcontroller of the electric motor unit.

The electric motor unit may also include a gate driver configured to generate a gate drive signal for turning the transistor on or off, under control of the microcontroller of the electric motor unit.

The gate driver may include a light emitting diode (LED) that generates light responsive to the microcontroller of the electric motor unit, and a photovoltaic cell positioned adjacent the LED that generates the gate drive signal in response to the light generated by the LED.

The microcontroller of the external controller and the microcontroller of the electric motor unit may be connected by at least one wire other than the at least one power phase line to provide for communications therebetween used for performing the authentication process.

The microcontroller of the external controller may be configured to transmit communications to the microcontroller of the electric motor unit by modulating a voltage on the at least one power phase line. The microcontroller of the electric motor unit may be configured to transmit communications to the microcontroller of the external controller by modulating the voltage on the at least one power phase line.

The electric motor unit may also include an authentication circuit that is configured to cooperate with the microcontroller of the electric motor unit when performing the authentication process.

The at least one power phase line may include first, second, and third power phase lines. The inverter may convert the DC electric power to 3-phase electric power, with a first phase being output on the first power phase line, a second phase being output on the second power phase line, and a third phase being output on the third power phase line. The at least one switch may be a first switch coupled between the first power phase line and a first phase winding of the electric motor, a second switch coupled between the second power phase line and a second phase winding of the electric motor, and a third switch coupled between the third power phase line and a third phase winding of the electric motor. The microcontroller of the electric motor unit may cause, in response to instruction by the microcontroller of the external controller and success of the authentication process, the first switch to couple the first power phase line to the first phase winding, the second switch to couple the second power phase line to the second phase winding, and the third switch to couple the third power phase line to the third phase winding.

The first switch may be a first n-channel transistor having a drain coupled to the first power phase line, a source coupled to the first phase winding of the electric motor, and a gate coupled to be controlled by the microcontroller of the electric motor unit. The second switch may be a second n-channel transistor having a drain coupled to the second power phase line, a source coupled to the second phase winding of the electric motor, and a gate coupled to be controlled by the microcontroller of the electric motor unit. The third switch may be a third n-channel transistor having a drain coupled to the third power phase line, a source coupled to the third phase winding of the electric motor, and a gate coupled to be controlled by the microcontroller of the electric motor unit.

The electric motor unit also include a gate driver configured to generate first, second, and third gate drive signals for turning the first, second, and third n-channel transistors on or off, under control of the microcontroller of the electric motor unit.

The gate driver may include: a first light emitting diode (LED) that generates light responsive to the microcontroller, and a first photovoltaic cell positioned adjacent the first LED that generates the first gate drive signal in response to the light generated by the first LED; a second LED that generates light responsive to the microcontroller, and a second photovoltaic cell positioned adjacent the second LED that generates the second gate drive signal in response to the light generated by the second LED; and a third LED that generates light responsive to the microcontroller, and a third photovoltaic cell positioned adjacent the third LED that generates the third gate drive signal in response to the light generated by the third LED.

Disclosed herein is an electric motor drive system including first, second, and third power phase lines, and an external controller. The external controller includes: a source of DC electric power; a microcontroller; and a 3-phase inverter configured to convert the DC electric power to 3-phase electric power and provide the 3-phase electric power across the first, second, and third power phase lines, under control of the microcontroller. An electric motor unit includes: a 3-phase electric motor; a communications circuit coupled to the first, second, and third power phase lines; a microcontroller configured for communication with the microcontroller of the external controller; and first, second, and third switches coupled between the first, second, and third power phase lines and the 3-phase motor, the first, second, and third switches being under control of the microcontroller.

The microcontroller of the external controller and the microcontroller of the electric motor unit are configured to perform an authentication process therebetween by communicating over the first, second, and third power phase lines. Communicating over the first, second, and third power phase lines is performed by: the microcontroller of the external controller modulating voltage on at least one of the first, second, and third power phase lines using the 3-phase inverter; and the communications circuit of the electric motor unit modulating the voltage on at least one of the first, second, and third power phase lines using the communications circuit, while keeping the first, second, and third switches closed.

The microcontroller of the electric motor unit is configured to cause the first, second, and third switches to electrically couple the first, second, and third power phase lines to the 3-phase electric motor in response to success of the authentication process and instruction by the microcontroller of the external controller.

The 3-phase inverter may include: a first high-side transistor coupled between a first node and the source of DC electric power; a first low-side transistor coupled between the first node and ground; a second high-side transistor coupled between a second node and the source of DC electric power; a second low-side transistor coupled between the second node and ground; a third high-side transistor coupled between a third node and the source of DC electric power; and a third low-side transistor coupled between the third node and ground. The first node is coupled to the first power phase line. The second node may be coupled to the second power phase line, and the third node is coupled to the third power phase line.

The electric motor unit may include a power supply arrangement configured to generate a digital power voltage from the first, second, and third power phase lines.

The communications circuit of the electric motor unit may include: a first resistor coupled between the first and second power phase lines; a first LED coupled between a transmit signal generated by the microcontroller of the electric motor unit and a digital power voltage; a first phototransistor coupled between the second and third power phase lines, the first phototransistor in proximity to the first LED such that when the first LED emits light, the first phototransistor turns on; a second LED coupled between the first and second power phase lines; and a second phototransistor having a first conduction terminal coupled to the digital power voltage and to a receive signal input of the microcontroller of the electric motor unit, and a second conduction terminal coupled to ground, the second phototransistor in proximity to the second LED such that when the second LED emits light, the second phototransistor turns on.

The microcontroller of the external controller may modulate voltage on the second power phase line by maintaining the first high side transistor and third low side transistor on, modulating the second low-side transistor, and maintaining the other transistors of the 3-phase inverter as being off.

The microcontroller of the electric motor unit may modulate voltage on the second phase line by: while the microcontroller of the external controller maintains the first highside transistor and third low-side transistor on, and maintains the other transistors of the 3-phase inverter as being off, the microcontroller of the electric motor unit modulates the transmit signal.

Also disclosed herein is an electric motor drive system. The electric motor drive system includes: at least one power phase line; an external controller configured to generate a drive signal and provide the drive signal to the at least one power phase line; and motor electronics. The motor electronics include: at least one switch coupled between the at least one power phase line and at least one electric motor terminal; and an internal controller configured to cooperate with the external controller to perform an authentication process therebetween. The external controller is further configured to cause the at least one switch to electrically couple the at least one power phase line to the at least one electric motor terminal in response to success of the authentication process.

The internal controller may include a gate driver configured to generate a gate drive signal for turning the switch on or off, and a microcontroller configured to cooperate with the external controller to perform the authentication process and to cause the gate driver to generate the gate drive signal in response to success of the authentication process and instruction by the external controller.

The gate driver may include a light emitting diode (LED) that generates light responsive to the microcontroller, and a photovoltaic cell positioned adjacent the LED that generates the gate drive signal in response to the light generated by the LED.

The internal controller and the external controller may be connected by at least one wire other than the at least one power phase line to provide for communications therebetween used for performing the authentication process.

The internal controller may be configured to transmit communications to the external controller by modulating a voltage on the at least one power phase line. The external controller may be configured to transmit communications to the internal controller by modulating the voltage on the at least one power phase line.

The at least one electric motor terminals may include first, second, and third electric motor terminals. The at least one power phase line may include first, second, and third power phase lines. The at least one switch may include a first switch coupled between the first power phase line and the first electric motor terminal, a second switch coupled between the second power phase line and the second electric motor terminal, and a third switch coupled between the third power phase line and the third electric motor terminal. The external controller may cause the first switch to couple the first power phase line to the first electric motor terminal in response to success of the authentication process. The external controller may cause the second switch to couple the second power phase line to the second electric motor terminal in response to success of the authentication process. The external controller may cause the third switch to couple the third power phase line to the third electric motor terminal in response to success of the authentication process.

Also disclosed herein is a method of operating an electric motor using an external controller. The method may include performing an authentication process between the external controller and the electric motor; generating motor phase power signals in response to success of the authentication process; and applying the motor phase power signals to the external motor in response to success of the authentication process.

The motor phase power signals may be applied to the external motor by closing switches coupled between the motor phase power signals and the electric motor in response to success of the authentication process.

DETAILED DESCRIPTION

The following disclosure enables a person skilled in the art to make and use the subject matter disclosed herein. The general principles described herein may be applied to embodiments and applications other than those detailed above without departing from the spirit and scope of this disclosure. This disclosure is not intended to be limited to the embodiments shown, but is to be accorded the widest scope consistent with the principles and features disclosed or suggested herein.

Figure 1:
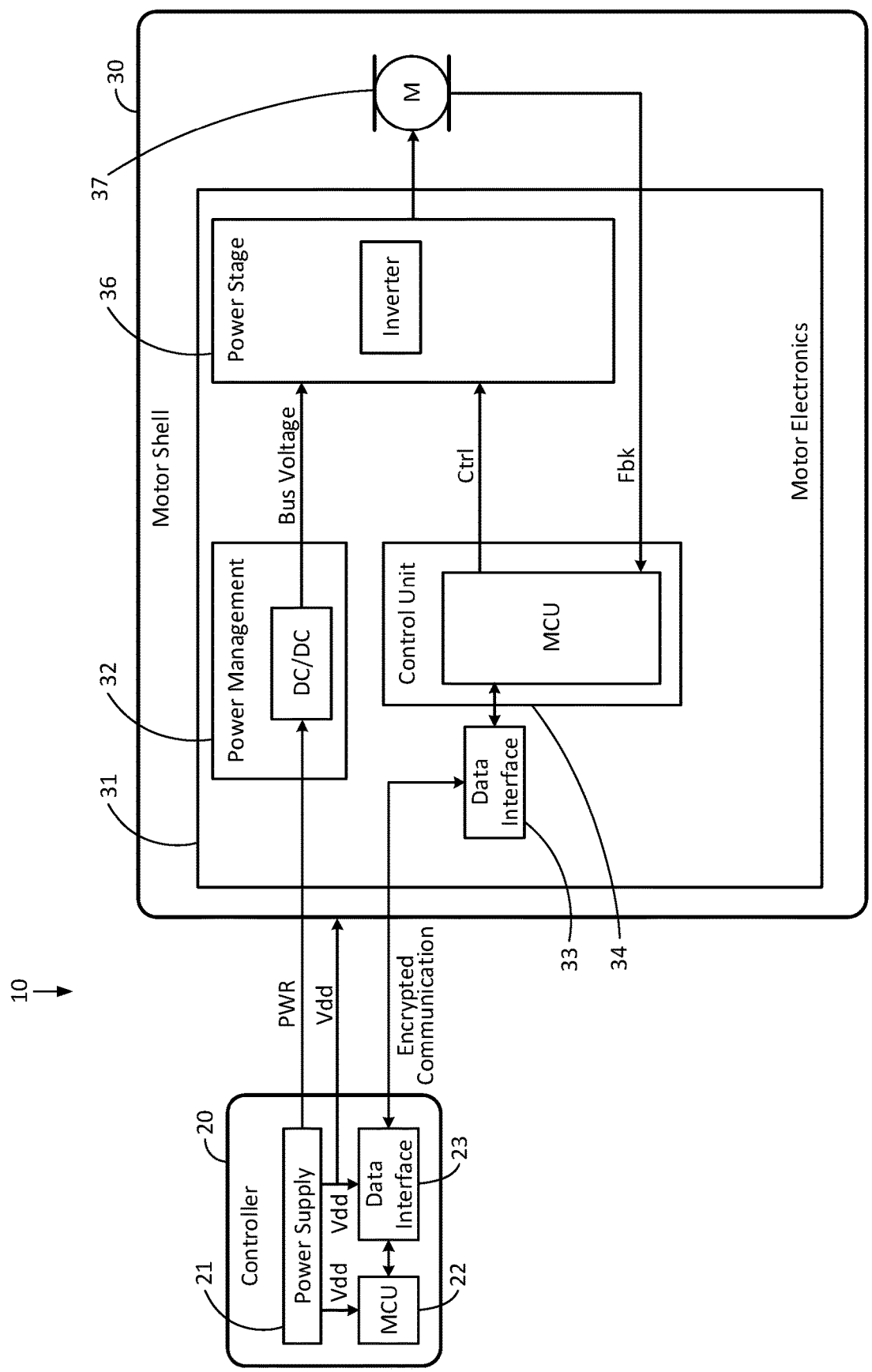
FIG. 1 is a block diagram of a first electric motor drive system that has an authentication function between the electric motor and the external controller driving the electric motor.

Now described with reference to FIG. 1 is an electric motor drive system 10 including an electric motor unit 30 and an external controller 20 for the electric motor unit 30. The electric motor unit 30 may be positioned at the wheel of a vehicle (e.g., two-wheeled vehicle, three-wheeled vehicle, four-wheeled vehicle, etc.) to provide rotational torque to the wheel to thereby cause acceleration or maintenance of speed of the vehicle, and the external controller 20 may be positioned at the chassis of the vehicle, with electrical connections therebetween formed by wires or other conductors.

The external controller 20 includes a power supply circuit 21, which generates a power signal PWR from power provided by a battery voltage (not shown), the power signal PWR being intended for use by the electric motor unit 30 to generate rotational torque. The power supply circuit 21 also generates a digital power signal Vdd for powering a microcontroller 22 and data interface 23 within the external controller 20.

The electric motor unit 30 includes a motor shell carrying an electric motor 37 and motor electronics 31 for powering and controlling the electric motor 37 based upon the power signal PWR, and based upon encrypted communications received from the data interface 23 of the external controller 20. The electric motor 37 may be a 3-phase brushless DC motor.

The motor electronics 31 includes a power management circuit 32, which includes a DC/DC converter that converts the power signal PWR to a bus voltage which is, in turn, converted by an inverter of a power stage 36 to produce a 3-phase drive signal for driving the electric motor 37. The motor electronics 31 also include a data interface 33 for interfacing with the data interface 23 of the external controller 20. A control unit 34 within the motor electronics 31 includes a microcontroller for communicating with the external controller 20 via the data interface 33, and for generating one or more control signals Ctrl for the power stage 36 based upon those communications. The electric motor 37 generates a feedback signal Fbk for use by the control unit 34, such as for use by the control unit 34 to determine motor speed.

The communications sent by the external controller 20 to the electric motor unit 30 are encrypted by the external controller 20 and decrypted by the control unit 34 of the motor electronics 31, and the communications sent by the electric motor unit 30 to the external controller 20 are encrypted by the control unit 34 of the motor electronics 31 and decrypted by the microcontroller 22 of the external controller 20.

To provide security, upon activation of the vehicle into which the electric motor drive system 10 is incorporated (e.g., a driver holding a key-fob paired to the vehicle enters the vehicle and instructs the vehicle to activate), the microcontroller 22 of the external controller 20 initiates and establishes secure encrypted communication with the control unit 34 inside the motor shell 30 its data interface 33, over dedicated communication wires. Once secure encrypted communication between the microcontroller 22 and the control unit 34 is established, the microcontroller 22 attempts to authenticate the motor 37 by sending an authentication request to the control unit 34. If the authentication request sent by the microcontroller 22 to the control unit 34 is an expected authentication request, and if the control unit 34 returns the expected authentication response, then the motor 37 is considered to be authenticated and is therefore verified to be an authorized part. At this point, the external controller 20 can begin control of the motor 37, such as for causing the vehicle to become driveable.

Security is provided by the electric motor drive system 10 in two ways. First, authentication is not performed until the secure encrypted communication is established between the controller 20 and the control unit 34—since an unauthorized part may be unable to establish the secure encrypted communication (e.g., due to a lack of being able to use the expected encryption protocol, etc), this first step removes the possibility of certain unauthorized motor units 30 and certain unauthorized controllers 20 from being able to communicate with one other, meaning that the motor 37 cannot be operated. The authentication adds a second level of security, since authentication is not achieved unless the authentication request sent by the microcontroller 22 of the external controller 20 to the control unit 34 of the motor unit 30 is an expected authentication request, and unless the control unit 34 returns the expected authentication response to the microcontroller 22.

Figure 2:
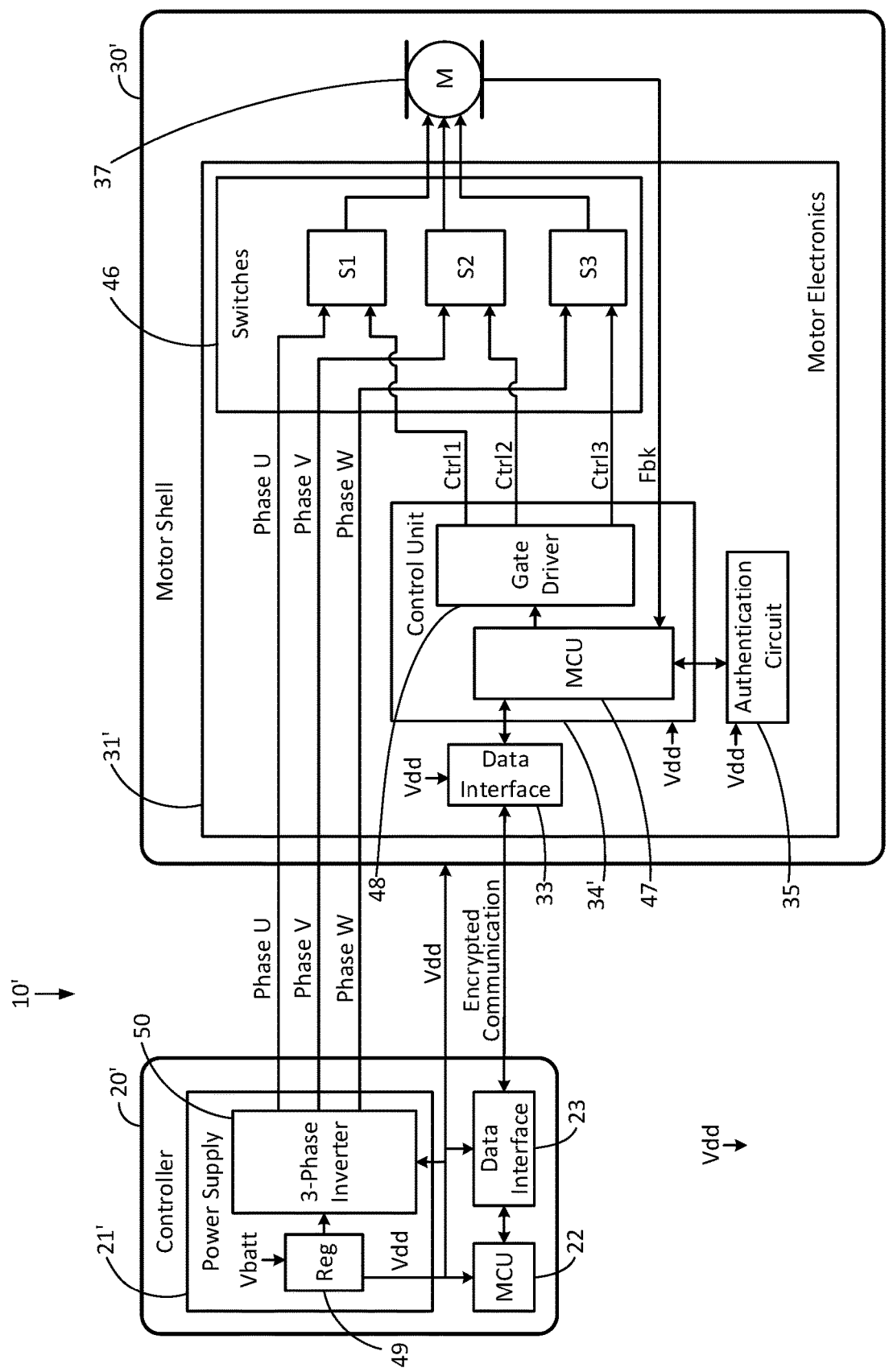
FIG. 2 is a block diagram of a second electric motor drive system that has an authentication function between the electric motor and the external controller driving the electric motor.

Now described with reference to FIG. 2 is a next embodiment of the electric motor drive system 10'. Here, the power supply circuit 21' of the external controller 20' includes a regulator circuit 49, which generates a digital power signal Vdd for powering the microcontroller 22, the data interface 23 and to the Control Unit 34', Data Interface 33 and Authentication Circuit 35 of Motor Electronics 31'. The regulator circuit 49 received an input voltage Vbatt from a battery, and provides an input voltage to a 3-phase inverter 50 within the power supply circuit 21' (instead of being located within the electric motor unit 30). The 3-phase inverter 50 generates the three power phase signals, Phase U, Phase V, and Phase W.

Here, the electric motor unit 30' includes a motor shell carrying the electric motor 37 (which here is a three-phase electric motor) and motor electronics 31' for powering and controlling the electric motor 37 with the three power phase signal Phase U, Phase V, and Phase W, and based upon encrypted communications received from the data interface 23 of the external controller 20'. Note that the motor electronics 31' include switches 46 electrically connected between the power phase signals Phase U, Phase V, and Phase W and respective phase windings of the electric motor 37, the switches 46 being controlled by control signals from the gate driver 48 (explained below). Namely, a switch S1 selectively electrically connects the power phase signal Phase U to a respective phase winding of the electric motor 37, a switch S2 selectively electrically connects the power phase signal Phase V to a respective phase winding of the electric motor 37, and a switch S3 selectively electrically connects the power phase signal Phase W to a respective phase winding of the electric motor 37.

Also here, the control unit 34' includes a microcontroller 47 that receives encrypted communications via the data interface 33, and transmits encrypted communications via the data interface 33. The microcontroller 37 generates control signals for a gate driver 48 within the control unit 34'. The gate driver 48 generates a control signal Ctrl1 for the switch S1 (that causes the switch S1 to act as an open circuit or a short), a control signal Ctrl2 for the switch S2 (that causes the switch S2 to act as an open circuit or a short), and a control signal Ctrl3 for the switch S3 (that causes the switch S3 to act as an open circuit or a short).

As will be explained below, the microcontroller 47 of the control unit 34' only causes the gate driver 48 to generate the control signals Crl1, Ctrl2, Ctrl3 that cause the switches S1, S2, and S3 to act as shorts to connect the power phase signals Phase U, Phase V, and Phase W to the phase windings of the motor 37 in response to encrypted communications received via the data interface 33 if the electric motor unit 30' and the external controller 20' have successfully performed an authentication process as described above.

To provide security, upon activation of the vehicle into which the electric motor drive system 10' is incorporated (e.g., a driver holding a key-fob paired to the vehicle enters the vehicle and instructs the vehicle to activate), the microcontroller 22 of the external controller 20' initiates and establishes secure encrypted communication with the microcontroller 47 of the control unit 34', inside the motor shell 30', via its data interface 33, over dedicated communication wires. Once secure encrypted communication between the microcontroller 22 and the microcontroller 47 of the control unit 34' is established, the microcontroller 22 attempts to authenticate the motor 37 by sending an authentication request to the microcontroller 47. If the authentication request sent by the microcontroller 22 to the microcontroller 47 is an expected authentication request, and if the microcontroller 47 returns the expected authentication response, then the motor 37 is considered to be authenticated and is therefore verified to be an authorized part.

With authentication successfully performed, the microcontroller 22 of the external controller 20' sends a switch enable command to the microcontroller 47 of the control unit 34' using the secure encrypted communication channel established over the dedicated communication wires. The microcontroller 47 in turn causes the gate driver 48 to generate the control signals Ctrl1, Ctrl2, and Ctrl3 such as to cause the switches S1, S2, and S3 to close (e.g., act as shorts).

Thereafter the microcontroller 22 begins polling the microcontroller 47 over the encrypted communication channel with a request for the status of the switches S1, S2, and S3. Once the microcontroller 22 receives a response from the microcontroller 47 over the encrypted communication channel indicating that the switches S1, S3, and S3 have been closed such that the power phase signals Phase U, Phase V, and Phase W may be provided to the motor 37, the microcontroller 22 begins to the operate the inverter 50 and the motor 37 so as to enable the user to drive the vehicle. Should the microcontroller 22 not receive a response from the microcontroller 47 over the encrypted communication channel in response to its polling after a given period of time (e.g., the microcontroller 47 times out), the microcontroller 22 disables the inverter 50, and may report this to another component within the vehicle.

When the vehicle is deactivated (e.g., the driver holding the key-fob paired to the vehicle exits the vehicle and instructs the vehicle to deactivate), the microcontroller 22 deactivates the inverter 50 to stop the motor 37. Once the motor 37 has stopped, the microcontroller 22 then sends a command over the encrypted communication channel to disable the switches S1, S2, and S3, and the encrypted communication channel is closed. Upon reactivation of the vehicle, the encrypted communication channel is re-established and the authentication process is re-performed, as described above. Therefore, at each motor start, the encrypted communication channel must be established and the authentication process must be successfully performed.

The motor electronics 31' are depicted as containing an authentication circuit 35 that is coupled to the microcontroller 47 of the control unit 34'. This authentication circuit 35 is a discrete specific purpose hardware element, which may perform the encryption/decryption and authentication at the electric motor drive system 10' described above. As an example, the authentication circuit 50 may be a STSAFE-A110 device, produced and sold by STMicroelectronics.

This authentication circuit 35 is optional, and instead the encryption/decryption and authentication at the electric motor drive system 10' described above may be performed by the microcontroller 47 using a crypto library, such as the X-CUBE-CRYPTOLIB library, produce and sold by STMicroelectronics.

Security is provided through this electric motor drive system 10' in two ways. First, authentication is not performed until the secure encrypted communication is established between the controller 20' and the control unit 34'—since an unauthorized part may be unable to establish the secure encrypted communication (e.g., due to a lack of being able to use the expected encryption protocol, etc), this first step removes the possibility of certain unauthorized motor units 30' and certain unauthorized controllers 20' from being able to communicate with one other, meaning that the motor 37 cannot be operated. The authentication adds a second level of security, since authentication is not achieved unless the authentication request sent by the microcontroller 22 of the external controller 20' to the control unit 34' of the motor unit 30' is an expected authentication request, and unless the control unit 34' returns the expected authentication response to the microcontroller 22.

Figure 3:
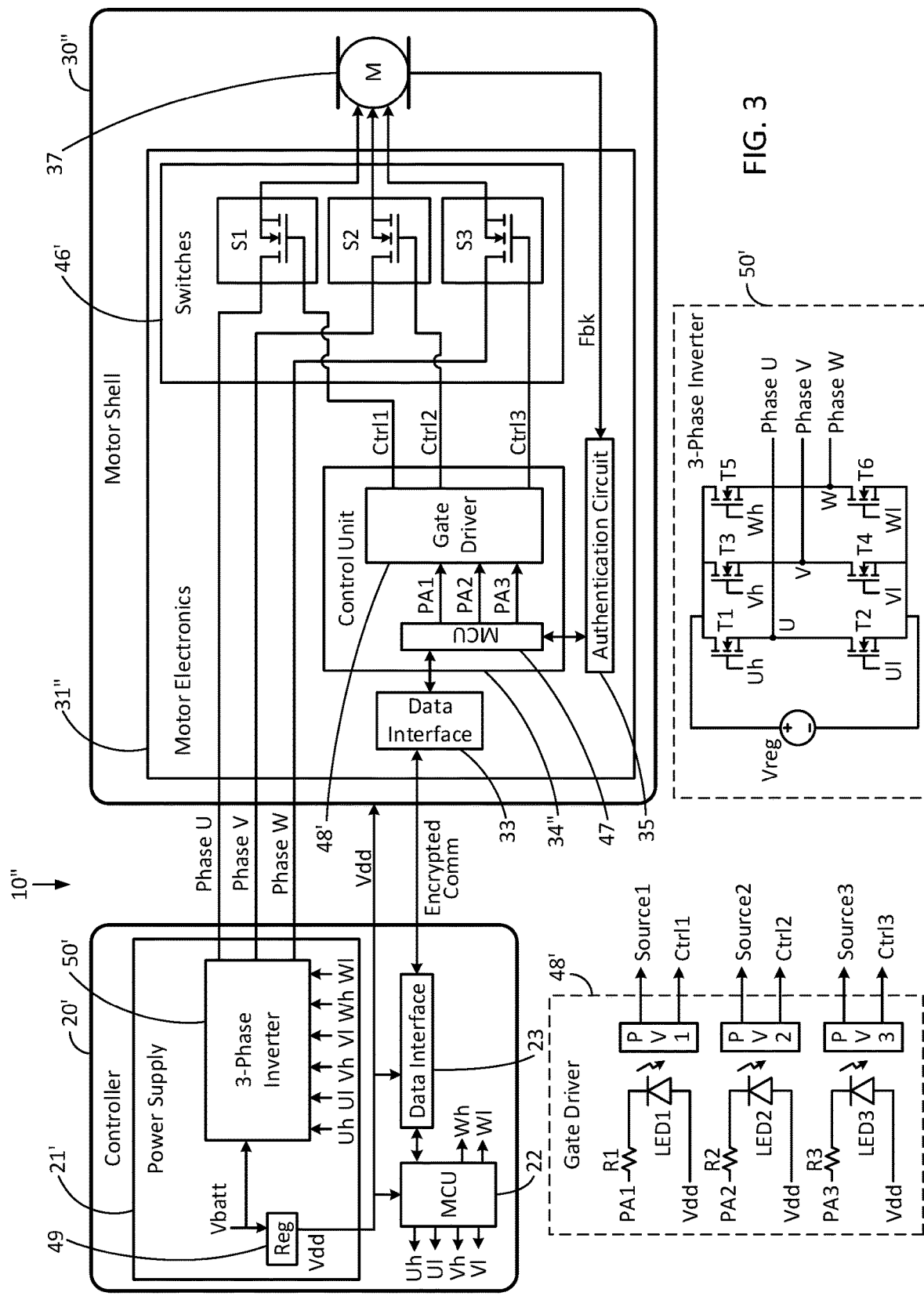
FIG. 3 is a block diagram of a third electric motor drive system that has an authentication function between the electric motor and the external controller driving the electric motor.

Now described with reference to FIG. 3 is a more detailed version 10" of the electric motor drive system 10'. In particular, here, the switches 46' are n-channel transistors. In particular: switch S1 is an n-channel transistor having a drain connected to receive the power phase signal U, a source connected to a first phase winding of the electric motor 37, and a gate connected to the first output of the gate driver 48'; switch S2 is an n-channel transistor having a drain connected to receive the power phase signal V, a source connected to a second phase winding of the electric motor 37, and a gate connected to the second output of the gate driver 48'; and switch S3 is an n-channel transistor having a drain connected to receive the power phase signal W, a source connected to a third phase winding of the electric motor 37, and a gate connected to the third output of the gate driver 48'. Also, here, the gate driver 48' is controlled by the microcontroller 47 such that the switches S1, S2, and S3, when on, conduct during positive and negative portions of their respective power phase signals U, V, and W. When off, the body diodes of the switches S1, S2, and S3 can conduct only from source to drain, but since current has to be first supplied from the inverter 50', there is no flow of current.

The gate driver 48' of the control unit 34" utilizes photovoltaic actuation to generate the control signals Ctrl1, Ctrl2, and Ctrl3. In particular, the gate driver 48' includes: a first led LED1 and photovoltaic cell PV1 pair, with LED1 having its cathode coupled to a control signal PA1 from the microcontroller 47 through a resistor R1, and having its anode coupled to the digital power signal Vdd, and with the photovoltaic cell PV1 generating the voltage control signal Ctrl1 with respect to the source Source1 for the switch S1 when LED1 is activated such that the switch S1 is turned on when LED1 is activated; a second led LED2 and photovoltaic cell PV2 pair, with LED2 having its cathode coupled to a control signal PA2 from the microcontroller 47 through a resistor R2, and having its anode coupled to the digital power signal Vdd, and with the photovoltaic cell PV2 generating the voltage control signal Ctr2 with respect to the source Source2 for the switch S2 when LED2 is activated such that the switch S2 is turned on when LED2 is activated; and a third led LED3 and photovoltaic cell PV3 pair, with LED3 having its cathode coupled to a control signal PA3 from the microcontroller 47 through a resistor R3, and having its anode coupled to the digital power signal Vdd, and with the photovoltaic cell PV3 generating the control voltage signal Ctrl3 with respect to the source Source3 for switch S3 when LED3 is activated such that the switch S3 is turned on when LED3 is activated.

A further difference here over the electric motor drive system 10' of FIG. 2 is that here, details of the 3-phase inverter 50' are shown. In particular, the inverter 50' is comprised of: n-channel transistor T1 having its drain connected to battery voltage Vbatt, its source connected to node U, and its gate connected to the U-phase high-side control signal Uh; n-channel transistor T2 having its drain connected to node U, its source connected to ground, and its gate connected to the U-phase low-side control signal Ul; n-channel transistor T3 having its drain connected to the battery voltage Vbatt, its source connected to node V, and its gate connected to the V-phase high-side control signal Vh; n-channel transistor T4 having its drain connected to node V, its source connected to ground, and its gate connected to the V-phase low-side control signal Vl; n-channel transistor T5 having its drain connected to the battery voltage Vbatt, its source connected to node W, and its gate connected to the W-phase high-side control signal Vh; and n-channel transistor T6 having its drain connected to node W, its source connected to ground, and its gate connected to the W-phase low-side control signal Wl.

The microcontroller 22 of the external controller 20' is responsible for generating the control signals Uh, Ul, Vh, Vl, Wh, and Wl to control the transistors T1-T6 of the inverter 50' in a desired way to cause the generation of the three power phase signals, Phase U, Phase V, and Phase W.

The electric motor drive system 10" operates as does the electric motor drive system 10' for establishing the encrypted communication channel and performing the authentication, with the exception being that the microcontroller 47 causes assertion of the control signals Ctrl1, Ctrl2, and Ctrl3 for the switches S1, S2, and S3 by asserting the control signals PA1, PA2, and PA3, which in turn cause LED1, LED2, and LED3 to turn on, in turn causing Ctrl1 to be asserted by PV1, Ctrl2 to be asserted by PV2, and Ctrl3 to be asserted by PV3. Notice that floating control voltages Ctrl1, Ctrl2, and Ctrl3 with respect to the source voltages Source1, Source2, and Source3 for the switches S1, S2, and S3 ensure turn-on of these switches when Ctrl1, Ctrl2, and Ctrl3 are asserted.

Figure 4:
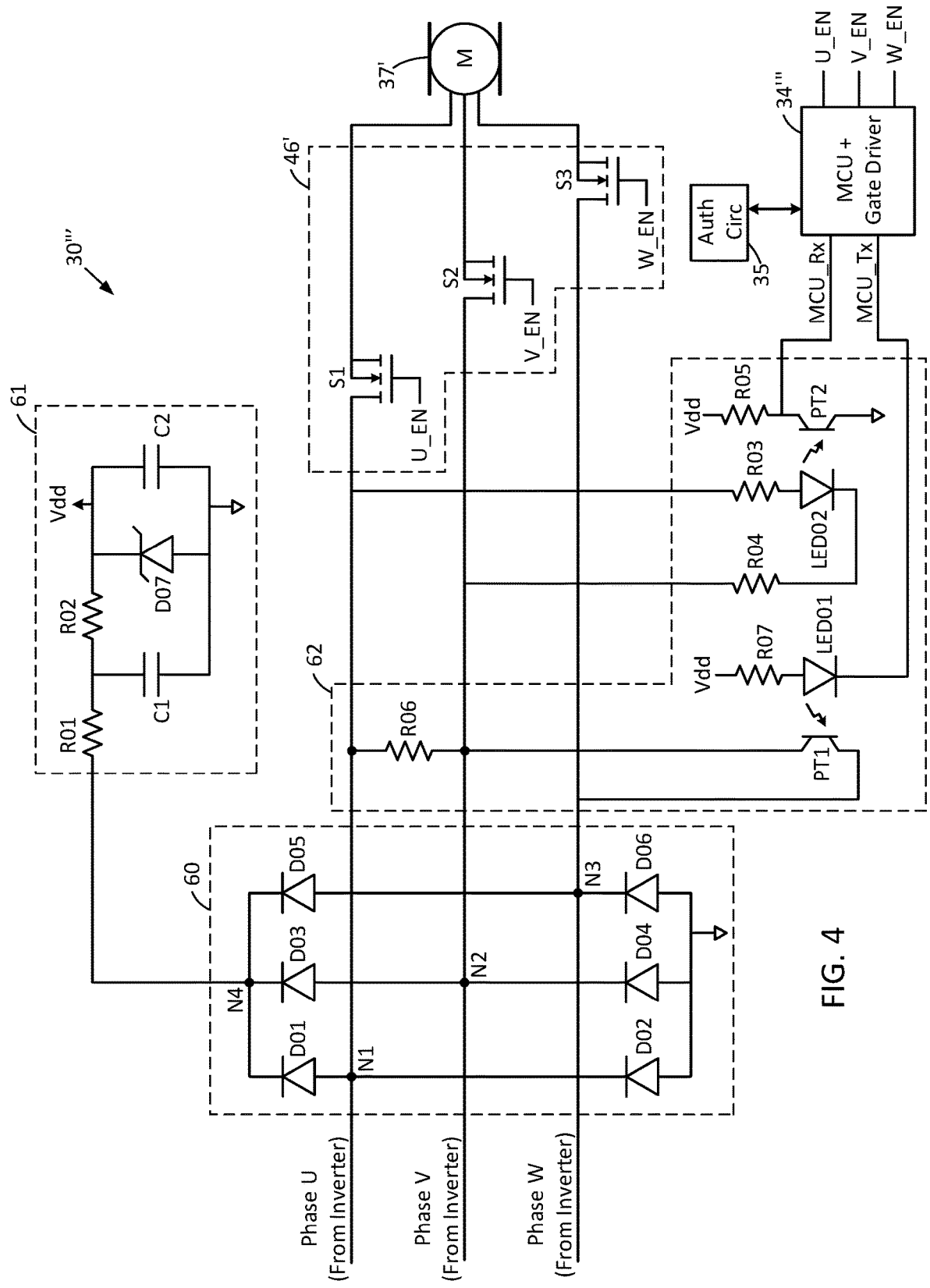
FIG. 4 is a block diagram of a fourth electric motor drive system that has an authentication function between the electric motor and the external controller driving the electric motor.

Now described with reference to FIG. 4 is another embodiment of the electric motor unit 30''' such as may be used with the external controller 20' of FIGS. 2-3. Here, the electric motor unit 30''' additionally includes a rectifier 60, power supply 61, and communications circuit 62. As will be explained below, the communications circuit 62 enables communications with the external controller without the use of an additional wire or wires for encrypted communication, and instead utilizes the wires carrying the power phase signals U, V, and W for communication as well as receipt of power.

The rectifier 60 is comprises: a first diode D01 having its anode connected to the power phase signal U at node N1 and its cathode connected to node N4; a second diode D02 having its anode connected to ground and its cathode connected to node N1; a third diode D03 having its anode connected to the power phase signal V at node N2 and its cathode connected to node N4; a fourth diode D04 having its anode connected to ground and its cathode connected to node N2; a fifth diode D05 having its anode connected to the power phase signal W at node N3 and its cathode connected to node N4; and a sixth diode D06 having its anode connected to ground and its cathode connected to node N3.

The power supply 61 includes: a zener diode D07 having its anode connected to ground and its cathode connected to produce the regulated digital power signal Vdd; a capacitor C2 connected between the digital power signal Vdd and ground; a resistor R02 having a first terminal connected to the cathode of the diode D07 and a second terminal connected to a first terminal of a capacitor C1; the capacitor C1, which has its first terminal connected to the second terminal of the resistor R02 and its second terminal connected to ground; and a resistor R01 connected between the first terminal of the capacitor C1 and node N4.

The switches 46' are n-channel transistors. In particular: switch S1 is an n-channel transistor having a drain connected to receive the power phase signal U, a source connected to a first phase winding of the electric motor 37, and a gate connected to receive the control signal U_EN from the MCU/gate driver 34'''; switch S2 is an n-channel transistor having a drain connected to receive the power phase signal V, a source connected to a second phase winding of the electric motor 37, and a gate connected to receive the control signal V_EN from the MCU/gate driver 34'''; and switch S3 is an n-channel transistor having a drain connected to receive the power phase signal W, a source connected to a third phase winding of the electric motor 37, and a gate connected to receive the control signal W_EN from the MCU/gate driver 34'''.

The communications circuit 62 includes: a resistor R06 connected between node N1 and node N2, a first phototransistor PT1 connected between nodes N2 and N3, and a first led LED01 having an anode connected to the digital power supply signal Vdd through a resistor R07 and a cathode connected to the MCU/gate driver 34''' which is activated through a transmit signal MCU_Tx therefrom; and a second phototransistor PT2 having a first conduction terminal connected to the digital power supply signal Vdd through a resistor R05 and a second conduction terminal connected to ground, and a second led LED02 having an anode connected to node N1 through resistor R03 and a cathode connected to node N2 through resistor R04. Notice that the first conduction terminal of the phototransistor PT2 is also connected to the MCU/gate driver 34''' to provide a receive signal MCU_Rx thereto.

Initially (for example, when the vehicle into which the electric motor unit 30''' is activated), the inverter (which is within the external controller, for example inverter 50' of FIG. 3) is off and not switching, and the switches S1, S2, and S3 are set to be off (act as open circuits) by the MCU/gate driver 34'''. Then, transistor T1 and transistor T6 of the inverter are turned on by assertion of the control signals Uh and Wl. This has the result of causing current to flow from the rectifier 60 into the capacitors C1 and C2 of the power supply 61, charging those capacitors, and generating the digital supply voltage Vdd.

Then, half-duplex communication is established by the external controller first maintaining transistor T1 and T6 of the inverter on, and modulating transistor T4 of the inverter to send data, while maintaining the other transistors of the inverter as being off. This sends data because, when transistor T4 is turned on (while transistor T1 is on), a path for current flow is established from node N1, through resistor R03, into the anode of the led LED02, out the cathode of LED02, and through resistor R04 to ground through transistor T4. Thus, when transistor T4 is turned on, the led LED02 turns on, causing phototransistor PT2 to turn on and pull the receive signal MCU_Rx to ground. Consequently, by maintaining the transistor T1 and T6 on while modulating the transistor T4, the external controller can transmit one bit at a time to the MCU/gate driver 34'''.

For communication from the electric motor unit 30''' back to the external controller, the external controller can maintain transistors T1 and T6 of the inverter on, and maintain the other transistors of the inverter as being off. Then, the MCU/gate driver 34''' can modulate the transmit signal MCU_Tx. When led LED01 is turned on (while transistors T1 and T6 are on), a path for current flow is established from node N1, through resistor R06, through phototransistor PT1, to ground through transistor T6. Therefore, when the transmit signal MCU_Tx is asserted, causing LED01 to turn on and in turn causing phototransistor PT1 to turn on, and pulling down the voltage at node N2 (and thus the voltage at node V of the inverter) is pulled down to zero volts. Consequently, then transistors T1 and T6 of the inverter of the external controller are maintained as being on while the other transistors of the inverter are maintained as being off, the MCU/gate driver 34''' can transmit one bit at a time to the external controller by modulating the transmit signal MCU_Tx.

With the way that the external controller and electric motor unit 30''' can communicate having been explained, operation of the electric motor unit 30''' to provide for security is now described. The initial communications from the external controller to the MCU/gate driver 34''' are to establish a secure encrypted communication channel between the external controller and the MCU/gate driver 34'''.

Once secure encrypted communication between the external controller and the MCU/gate driver 34''' is established, the external controller attempts to authenticate the motor 37 by sending an authentication request to the MCU/gate driver 34'''. If the authentication request sent by the external controller to the MCU/gate driver 34''' is an expected authentication request, and if the MCU/gate driver 34''' returns the expected authentication response, then the motor 37 is considered to be authenticated and is therefore verified to be an authorized part.

With authentication successfully performed, the external controller sends a switch enable command to the MCU/gate driver 34''' using the secure encrypted communication channel established over the wires carrying the power phase signals, Phase U, Phase V, and Phase W. Thereafter the external controller begins polling the MCU/gate driver 34''' over the encrypted communication channel with a request for the switch enable acknowledgement. After acknowledging the successful reception of switch enable command, the MCU/gate driver 34'' ' in turns generate the control signals U_En, V_En, and W_En such as to cause the transistors S1, S2, and S3 to close (e.g., act as shorts).

Once the external controller receives a response from the MCU/gate driver 34''' over the encrypted communication channel indicating that the switches S1, S3, and S3 are being closed such that the power phase signals Phase U, Phase V, and Phase W may be provided to the motor 37', the external controller activates the inverter output to the motor 37 so as to enable the user to drive the vehicle. Should the external controller not receive a response from the MCU/gate driver 34''' over the encrypted communication channel in response to its polling after a given period of time (e.g., the MCU/gate driver 34''' times out), the external controller disables its inverter, and may report this to another component within the vehicle.

When the vehicle is deactivated (e.g., the driver holding the key-fob paired to the vehicle exits the vehicle and instructs the vehicle to deactivate), the external controller deactivates its inverter. This means that the power supply 61 within the electric motor unit 30''' is no longer able to generate the digital supply voltage Vdd, with the result being that the MCU/gate driver 34''' turns off, the control signals U_En, V_En, and W_En decay, and the switches S1, S2, and S3 open. Upon reactivation of the vehicle, digital supply voltage Vdd is first generated as described above, the encrypted communication channel can then be re-established, and the authentication process can be re-performed, as described above. Therefore, at each motor start, the encrypted communication channel must be established and the authentication process must be successfully performed.

Security is provided through this electric motor drive system 10''' in two ways. First, authentication is not performed until the secure encrypted communication is established between the external controller and the MCU/gate driver 34'''—since an unauthorized part may be unable to establish the secure encrypted communication (e.g., due to a lack of being able to use the expected encryption protocol, etc), this first step removes the possibility of certain unauthorized motor units 30''' and certain unauthorized external controllers from being able to communicate with one other, meaning that the motor 37 cannot be operated. The authentication adds a second level of security, since authentication is not achieved unless the authentication request sent by the external controller to the MCU/gate driver 34''' is an expected authentication request, and unless the MCU/gate driver 34''' returns the expected authentication response to the external controller.

The electric motor driver systems 10', 10'', and 10''' described above provide for both theft protection, as well as protection against the use of counterfeit or unapproved parts. Theft protection is provided because only an approved external controller is capable of establishing the secure communication with the electric motor unit 30', 30'', and 30''' and successfully performing the authentication, as well as activating the switches S1, S2, and S3. Thus, an unauthenticated external controller is unable to cause operation of the motor (and likely does not include a suitable inverter to provide power to the motor). This means a counterfeit external controller will be unable to cause operation of the motor, so in addition to providing theft protection, an OEM external controller cannot be replaced with a counterfeit external controller for repairs. This also meant that a counterfeit motor will not be operated by an OEM external controller, since the authorization process will fail.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. An electric motor drive system, comprising:
   at least one power phase line;
   an external controller, the external controller comprising:
      a source of DC electric power;
      a microcontroller; and
      an inverter configured to convert the DC electric power to a drive signal and provide the drive signal to the at least one power phase line, under control of the microcontroller; and
   an electric motor unit, the electric motor unit comprising:
      an electric motor;
      a microcontroller configured for communication with the microcontroller of the external controller; and
      at least one switch coupled between the at least one power phase line and the electric motor, the at least one switch being under control of the microcontroller of the electric motor unit;
   wherein the microcontroller of the external controller and the microcontroller of the electric motor unit are configured to perform an authentication process therebetween; and
   wherein the microcontroller of the external controller is configured to instruct the microcontroller of the electric motor unit to cause the at least one switch to electrically couple the at least one power phase line to the electric motor in response to success of the authentication process.

2. The electric motor drive system of claim 1, wherein the at least one switch comprises a transistor having a first conduction terminal coupled to the at least one power phase line, a second conduction terminal coupled to the electric motor, and a control terminal coupled to be controlled by the microcontroller of the electric motor unit.

3. The electric motor drive system of claim 2, wherein the electric motor unit further comprises a gate driver configured to generate a gate drive signal for turning the transistor on or off, under control of the microcontroller of the electric motor unit.

4. The electric motor drive system of claim 3, wherein the gate driver comprises a light emitting diode (LED) that generates light responsive to the microcontroller of the electric motor unit, and a photovoltaic cell positioned adjacent the LED that generates the gate drive signal in response to the light generated by the LED.

5. The electric motor drive system of claim 1, wherein the microcontroller of the external controller and the microcontroller of the electric motor unit are connected by at least one wire other than the at least one power phase line to provide for communications therebetween used for performing the authentication process.

6. The electric motor drive system of claim 1, wherein the microcontroller of the external controller is configured to transmit communications to the microcontroller of the electric motor unit by modulating a voltage on the at least one power phase line; and wherein the microcontroller of the electric motor unit is configured to transmit communications to the microcontroller of the external controller by modulating the voltage on the at least one power phase line.

7. The electric motor drive system of claim 1, wherein the electric motor unit further comprises an authentication circuit that is configured to cooperate with the microcontroller of the electric motor unit when performing the authentication process.

8. The electric motor drive system of claim 1, wherein:
   the at least one power phase line comprises first, second, and third power phase lines;
   the inverter converts the DC electric power to 3-phase electric power, with a first phase being output on the first power phase line, a second phase being output on the second power phase line, and a third phase being output on the third power phase line;
   the at least one switch comprises a first switch coupled between the first power phase line and a first phase winding of the electric motor, a second switch coupled between the second power phase line and a second phase winding of the electric motor, and a third switch coupled between the third power phase line and a third phase winding of the electric motor; and
   the microcontroller of the electric motor unit causes, in response to instruction by the microcontroller of the external controller and success of the authentication process, the first switch to couple the first power phase line to the first phase winding, the second switch to couple the second power phase line to the second phase winding, and the third switch to couple the third power phase line to the third phase winding.

9. The electric motor drive system of claim 8, wherein:
the first switch comprises a first n-channel transistor having a drain coupled to the first power phase line, a source coupled to the first phase winding of the electric motor, and a gate coupled to be controlled by the microcontroller of the electric motor unit;
the second switch comprises a second n-channel transistor having a drain coupled to the second power phase line, a source coupled to the second phase winding of the electric motor, and a gate coupled to be controlled by the microcontroller of the electric motor unit; and
the third switch comprises a third n-channel transistor having a drain coupled to the third power phase line, a source coupled to the third phase winding of the electric motor, and a gate coupled to be controlled by the microcontroller of the electric motor unit.

10. The electric motor drive system of claim 9, wherein the electric motor unit further comprises a gate driver configured to generate first, second, and third gate drive signals for turning the first, second, and third n-channel transistors on or off, under control of the microcontroller of the electric motor unit.

11. The electric motor drive system of claim 10, wherein the gate driver comprises:
a first light emitting diode (LED) that generates light responsive to the microcontroller, and a first photovoltaic cell positioned adjacent the first LED that generates the first gate drive signal in response to the light generated by the first LED;
a second LED that generates light responsive to the microcontroller, and a second photovoltaic cell positioned adjacent the second LED that generates the second gate drive signal in response to the light generated by the second LED; and
a third LED that generates light responsive to the microcontroller, and a third photovoltaic cell positioned adjacent the third LED that generates the third gate drive signal in response to the light generated by the third LED.

12. An electric motor drive system, comprising:
first, second, and third power phase lines;
an external controller, the external controller comprising:
a source of DC electric power;
a microcontroller; and
a 3-phase inverter configured to convert the DC electric power to 3-phase electric power and provide the 3-phase electric power across the first, second, and third power phase lines, under control of the microcontroller; and
an electric motor unit, the electric motor unit comprising:
a 3-phase electric motor;
a communications circuit coupled to the first, second, and third power phase lines;
a microcontroller configured for communication with the microcontroller of the external controller; and
first, second, and third switches coupled between the first, second, and third power phase lines and the 3-phase electric motor, the first, second, and third switches being under control of the microcontroller of the electric motor unit;
wherein the microcontroller of the external controller and the microcontroller of the electric motor unit are configured to perform an authentication process therebetween by communicating over the first, second, and third power phase lines, wherein communicating over the first, second, and third power phase lines is performed by:
the microcontroller of the external controller modulating voltage on at least one of the first, second, and third power phase lines using the 3-phase inverter; and
the communications circuit of the electric motor unit modulating the voltage on at least one of the first, second, and third power phase lines using the communications circuit, while keeping the first, second, and third switches closed; and
wherein the microcontroller of the electric motor unit is configured to cause the first, second, and third switches to electrically couple the first, second, and third power phase lines to the 3-phase electric motor in response to success of the authentication process and instruction by the microcontroller of the external controller.

13. The electric motor drive system of claim 12, wherein the 3-phase inverter comprises:
a first high-side transistor coupled between a first node and the source of DC electric power;
a first low-side transistor coupled between the first node and ground;
a second high-side transistor coupled between a second node and the source of DC electric power;
a second low-side transistor coupled between the second node and ground;
a third high-side transistor coupled between a third node and the source of DC electric power; and
a third low-side transistor coupled between the third node and ground;
wherein the first node is coupled to the first power phase line, wherein the second node is coupled to the second power phase line, and wherein the third node is coupled to the third power phase line.

14. The electric motor drive system of claim 13, wherein the electric motor unit comprises a power supply arrangement configured to generate a digital power voltage from the first, second, and third power phase lines.

15. The electric motor drive system of claim 13, wherein the communications circuit of the electric motor unit comprises:
a first resistor coupled between the first and second power phase lines;
a first LED coupled between a transmit signal generated by the microcontroller of the electric motor unit and a digital power voltage;
a first phototransistor coupled between the second and third power phase lines, the first phototransistor in proximity to the first LED such that when the first LED emits light, the first phototransistor turns on;
a second LED coupled between the first and second power phase lines; and
a second phototransistor having a first conduction terminal coupled to the digital power voltage and to a receive signal input of the microcontroller of the electric motor unit, and a second conduction terminal coupled to ground, the second phototransistor in proximity to the second LED such that when the second LED emits light, the second phototransistor turns on.

16. The electric motor drive system of claim 15, wherein the microcontroller of the external controller modulates voltage on the second power phase line by maintaining the first high-side transistor and third low side transistor on, modulating the second low-side transistor, and maintaining the other transistors of the 3-phase inverter as being off.

17. The electric motor drive system of claim 16, wherein the microcontroller of the electric motor unit modulates voltage on the second power phase line by:
while the microcontroller of the external controller maintains the first high-side transistor and third low-side transistor on, and maintains the other transistors of the 3-phase inverter as being off, the microcontroller of the electric motor unit modulates the transmit signal.

18. An electric motor drive system, comprising:
at least one power phase line;
an external controller configured to generate a drive signal and provide the drive signal to the at least one power phase line; and
motor electronics, the motor electronics comprising:
at least one switch coupled between the at least one power phase line and at least one electric motor terminal; and
an internal controller configured to cooperate with the external controller to perform an authentication process therebetween, wherein internal controller is configured to transmit communications to the external controller by modulating a voltage on the at least one power phase line, and wherein the external controller is configured to transmit communications to the internal controller by modulating the voltage on the at least one power phase line;
wherein the external controller is further configured to cause the at least one switch to electrically couple the at least one power phase line to the at least one electric motor terminal in response to success of the authentication process.

19. The electric motor drive system of claim 18, wherein the internal controller includes a gate driver configured to generate a gate drive signal for turning the at least one switch on or off, and a microcontroller configured to cooperate with the external controller to perform the authentication process and to cause the gate driver to generate the gate drive signal in response to success of the authentication process and instruction by the external controller.

20. The electric motor drive system of claim 19, wherein the gate driver comprises a light emitting diode (LED) that generates light responsive to the microcontroller, and a photovoltaic cell positioned adjacent the LED that generates the gate drive signal in response to the light generated by the LED.

21. The electric motor drive system of claim 18, wherein the internal controller and the external controller are connected by at least one wire other than the at least one power phase line to provide for communications therebetween used for performing the authentication process.

22. The electric motor drive system of claim 18, wherein:
the at least one electric motor terminal comprises first, second, and third electric motor terminals;
the at least one power phase line comprises first, second, and third power phase lines;
the at least one switch comprises a first switch coupled between the first power phase line and the first electric motor terminal, a second switch coupled between the second power phase line and the second electric motor terminal, and a third switch coupled between the third power phase line and the third electric motor terminal;
the external controller causes the first switch to couple the first power phase line to the first electric motor terminal in response to success of the authentication process;
the external controller causes the second switch to couple the second power phase line to the second electric motor terminal in response to success of the authentication process; and
the external controller causes the third switch to couple the third power phase line to the third electric motor terminal in response to success of the authentication process.

23. A method of operating an electric motor using an external controller, the method comprising:
performing an authentication process between the external controller and the electric motor in which communications are transmitted by an internal controller to the external controller by modulating a voltage on at least one power phase line, and in which communications are transmitted by the external controller to the internal controller by modulating the voltage on the at least one power phase line;
generating motor phase power signals in response to success of the authentication process; and
applying the motor phase power signals to the electric motor, over the at least one power phase line, in response to success of the authentication process.

24. The method of claim 23, wherein the motor phase power signals are applied to the electric motor by closing switches to couple the at least one power phase line between the motor phase power signals and the electric motor in response to success of the authentication process.

25. The method of claim 23, wherein applying the motor phase power signals to the electric motor causes the electric motor to apply rotational torque to a wheel of a vehicle.

26. The method of claim 18, wherein causing the at least one switch to electrically couple the at least one power phase line to the at least one electric motor terminal in response to success of the authentication process causes an electric motor to apply rotational torque to a wheel of a vehicle.

* * * * *